United States Patent
Chen et al.

(10) Patent No.: US 11,801,574 B2
(45) Date of Patent: Oct. 31, 2023

(54) WELDING SYSTEMS AND METHODS WITH KNURLED WELD INTERFACES FOR METALLIC WORKPIECES

(71) Applicant: GM GLOBAL TECHNOLOGY OPERATIONS LLC, Detroit, MI (US)

(72) Inventors: Chih-Chang Chen, Rochester Hills, MI (US); Jacob W. Disbro, Troy, MI (US); Robert H. Dietze, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 862 days.

(21) Appl. No.: 16/811,627

(22) Filed: Mar. 6, 2020

(65) Prior Publication Data

US 2021/0276134 A1 Sep. 9, 2021

(51) Int. Cl.
| | |
|---|---|
| B23K 28/02 | (2014.01) |
| B23K 33/00 | (2006.01) |
| B23K 26/322 | (2014.01) |
| B23K 26/244 | (2014.01) |
| H01M 10/0525 | (2010.01) |

(Continued)

(52) U.S. Cl.
CPC ............ *B23K 28/02* (2013.01); *B23K 26/244* (2015.10); *B23K 26/322* (2013.01); *B23K 33/002* (2013.01); *H01M 10/0525* (2013.01); *H01M 50/531* (2021.01); *B23K 37/02* (2013.01); *B23K 2101/36* (2018.08); *B23K 2103/10* (2018.08)

(58) Field of Classification Search
CPC .... B23K 28/02; B23K 26/244; B23K 26/322; B23K 33/002; B23K 2103/10; B23K 2101/36; B23K 37/02; H01M 10/0525; H01M 50/531

USPC .................................................... 219/121.64
See application file for complete search history.

(56) References Cited

U.S. PATENT DOCUMENTS

| | | | |
|---|---|---|---|
| 4,883,937 A | 11/1989 | Matsuno et al. | |
| 6,103,075 A | 8/2000 | Winsel et al. | |

(Continued)

FOREIGN PATENT DOCUMENTS

| | | | |
|---|---|---|---|
| CN | 102049616 A | | 5/2011 |
| CN | 110480166 A | * | 11/2019 |

(Continued)

*Primary Examiner* — John J Norton
*Assistant Examiner* — Simpson A Chen
(74) *Attorney, Agent, or Firm* — Quinn IP Law

(57) ABSTRACT

Presented are metalworking systems for joining metallic workpieces, methods for forming and welding such workpieces, and lithium-ion battery pouch cells with anodized aluminum tabs joined via knurling and laser welding. A method for laser welding abutting sections of a workpiece or stackup of workpieces includes receiving, via a workpiece support frame, one or more metallic workpieces each with a surface having applied thereto a treatment layer. This treatment layer releases a gas during welding. A metalworking device forms a knurl pattern into the workpiece surface with the treatment layer. The knurl pattern includes a network of channels, such as one or more series of mutually parallel, rectilinear vent channels, designed to exhaust therethrough the gas released from a welded section of the treatment layer. A laser welding device thereafter welds a joint region of the surface(s) of the one or more metallic workpiece with the knurl pattern.

20 Claims, 3 Drawing Sheets

(51) Int. Cl.
  *H01M 50/531* (2021.01)
  *B23K 37/02* (2006.01)
  *B23K 101/36* (2006.01)
  *B23K 103/10* (2006.01)

(56) References Cited

U.S. PATENT DOCUMENTS

| | | | |
|---|---|---|---|
| 6,275,004 | B1 | 8/2001 | Tamai et al. |
| 6,639,385 | B2 | 10/2003 | Verbrugge et al. |
| 7,109,685 | B2 | 9/2006 | Tate, Jr. et al. |
| 7,324,902 | B2 | 1/2008 | Verbrugge et al. |
| 7,373,264 | B2 | 5/2008 | Verbrugge et al. |
| 7,612,532 | B2 | 11/2009 | Verbrugge |
| 7,768,233 | B2 | 8/2010 | Lin et al. |
| 7,928,690 | B2 | 4/2011 | Koch et al. |
| 8,054,046 | B2 | 11/2011 | Lin et al. |
| 8,108,160 | B2 | 1/2012 | Liu et al. |
| 8,170,818 | B2 | 5/2012 | Lin et al. |
| 8,198,864 | B2 | 6/2012 | Koch et al. |
| 8,212,519 | B2 | 7/2012 | Koch et al. |
| 8,321,164 | B2 | 11/2012 | Liu et al. |
| 8,403,019 | B2 | 3/2013 | Khakhalev |
| 8,565,949 | B2 | 10/2013 | Christman et al. |
| 8,581,543 | B2 | 11/2013 | Koch et al. |
| 8,645,088 | B2 | 2/2014 | Schaefer et al. |
| 8,836,280 | B2 | 9/2014 | Koch et al. |
| 9,142,980 | B2 | 9/2015 | Lee |
| 9,172,118 | B2 | 10/2015 | Marsh et al. |
| 9,176,194 | B2 | 11/2015 | Meisner et al. |
| 9,337,484 | B2 | 5/2016 | Verbrugge et al. |
| 9,354,277 | B2 | 5/2016 | Lin et al. |
| 9,461,490 | B2 | 10/2016 | Ying |
| 9,513,338 | B2 | 12/2016 | Koch et al. |
| 9,660,462 | B2 | 5/2017 | Jeon |
| 2005/0247678 | A1* | 11/2005 | Wang .............. B23K 11/166 219/121.64 |
| 2008/0284385 | A1 | 11/2008 | Namuduri et al. |
| 2008/0290070 | A1 | 11/2008 | Fleming et al. |
| 2011/0095000 | A1* | 4/2011 | Nowak .............. B23K 15/0093 219/121.64 |
| 2011/0215767 | A1 | 9/2011 | Johnson et al. |
| 2011/0248675 | A1 | 10/2011 | Shiu et al. |
| 2011/0309838 | A1 | 12/2011 | Lin et al. |
| 2012/0181854 | A1 | 7/2012 | Gopalakrishnan et al. |
| 2012/0206296 | A1 | 8/2012 | Wan |
| 2013/0119935 | A1 | 5/2013 | Sufrin-Disler et al. |
| 2013/0127399 | A1 | 5/2013 | Tang et al. |
| 2014/0004420 | A1* | 1/2014 | Hatanaka .............. H01M 10/052 429/211 |
| 2014/0152232 | A1 | 6/2014 | Johnson et al. |
| 2014/0297084 | A1 | 10/2014 | Meisner et al. |
| 2015/0301116 | A1 | 10/2015 | Baker et al. |
| 2015/0318502 | A1 | 11/2015 | Kanai |
| 2016/0039419 | A1 | 2/2016 | Wampler et al. |
| 2016/0043360 | A1* | 2/2016 | Byun .............. B23K 20/106 156/580.2 |
| 2016/0077160 | A1 | 3/2016 | Wampler, II et al. |
| 2016/0114428 | A1* | 4/2016 | Wang .............. B23K 26/32 219/121.64 |
| 2016/0254562 | A1 | 9/2016 | Morris-Cohen et al. |
| 2016/0259011 | A1 | 9/2016 | Joe |
| 2016/0293991 | A1 | 10/2016 | Goeltz et al. |
| 2016/0372777 | A1 | 12/2016 | Buckley et al. |
| 2017/0066076 | A1 | 3/2017 | Li et al. |
| 2017/0077507 | A1 | 3/2017 | Harada et al. |
| 2018/0375132 | A1 | 12/2018 | Li et al. |
| 2019/0157710 | A1 | 5/2019 | Makino et al. |
| 2020/0185690 | A1* | 6/2020 | Kim .............. H01M 50/536 |
| 2022/0048129 | A1* | 2/2022 | Böhm .............. B23K 26/244 |

FOREIGN PATENT DOCUMENTS

| | | |
|---|---|---|
| CN | 110480166 A | 11/2019 |
| EP | 1422016 A2 | 5/2004 |
| EP | 2248624 A1 | 11/2010 |
| JP | 2000246445 A | 9/2000 |

* cited by examiner

WELDING SYSTEMS AND METHODS WITH KNURLED WELD INTERFACES FOR METALLIC WORKPIECES

INTRODUCTION

The present disclosure relates generally to metalworking techniques for joining metallic workpieces. More specifically, aspects of this disclosure relate to laser welding systems for uniting anodized aluminum battery cell tabs.

Welding is a fabrication and repair process that bonds materials, usually metals or thermoplastics, by causing coalescence—the process by which two separate units or adjacent sections of a single unit grow together, fuse, or merge into a single body/section. In a joining operation, for example, two workpieces are oftentimes juxtaposed in abutting side-by-side relation, and then fused together by liquefying or plasticizing (softening without liquefying) the areas to be bonded together. Workpiece liquefaction/plasticization may be achieved through the application of heat, electric arc, electron beam, ultrasound, pressure, friction, or any combination thereof. For non-autogenous welding techniques, a filler material is added and melted to form a localized pool of molten material (a "weld puddle"). Promoting coalescence of the liquefied or plasticized materials, and subsequently allowing the coalesced materials to cool will solidify the bond. Welding can be used, for example, to permanently join two or more workpieces, to operate on a single workpiece (e.g., to repair a crack or join two segments).

While there are countless techniques available for joining and repairing metal workpieces, many modern-day manufacturing facilities employ laser beam welding processes to unite workpieces. In automotive applications, for example, a robot-borne welding head implements a high-voltage gas or solid-state laser to join the cell tabs of neighboring lithium-ion battery cells or the sheet-metal body panels to a vehicle chassis. During laser welding, energy from the laser beam penetrates abutting sections of the metal workpieces, heating the workpieces to a sufficiently high temperature so that they melt and coalesce together to form a weld joint. In certain applications, surfaces of the workpieces are anodized with an oxide layer to increase resistance to corrosion and wear; in the weld joint region, the laser causes this anodized layer to release gas. Pressure in the weld region causes the gas to expand and "gas out" through the molten weld pool created by the laser beam, resulting in weld spatter, weld joint porosity, and surface contamination.

SUMMARY

Presented herein are welding systems for joining metallic workpieces, methods for making and methods for operating such systems, and lithium-ion battery pouch cells with anodized aluminum tabs joined via knurling and laser welding. By way of example, there are presented methods for laser welding battery terminals/tabs, e.g., to each other or to an electrical busbar. In electrified vehicle propulsion systems, the electrical tabs of a lithium-ion battery pouch cell may be cut or stamped from thin aluminum (Al) or aluminum alloy sheet metal that is surface treated, for example, via electrolytic passivation (anodizing). When surface treated Al battery cell tabs are laser welded together or to a busbar, absorbed moisture in the anodized layer releases hydrogen in the melt, which causes porosities to form in the weld region. To mitigate any resultant porosity, a rolling or stamping process knurls each cell tab prior to welding in order to create an engineered "serration" pattern on the tab's contact surface. These knurl patterns may be typified by a predefined arrangement of recessed channels, gaps and protrusions that cooperatively define venting paths for the dissolved gases. During welding, entrained gases escape from the solidifying weld through these venting paths, leading to a substantial reduction in trapped gas bubbles and the ensuing weld porosities.

Presented herein are methods for manufacturing any of the disclosed battery pouch cells and methods for operating any of the disclosed metalworking systems. In an example, a method is presented for laser welding a designated section or abutting sections of a workpiece or stackup of workpieces. This representative method includes, in any order and in any combination with any of the above and below disclosed options and features: receiving (e.g., via a workpiece support frame) at least one or, for a preferred implementation, a stack of (three or more) metallic workpieces with at least one surface or, for the preferred implementation, opposing surfaces having applied thereto a (first anodized) treatment layer, the (first anodized) treatment layer releasing gas as a result of being welded; forming, via a metalworking device, a debossed (first knurl) pattern into the surface or surfaces of each metallic workpiece, the debossed (first knurl) pattern including a network of channels configured to exhaust therethrough the gas released from a welded section of the (first anodized) treatment layer(s); and welding, via a laser welding device, a joint region of the surface(s) of the metallic workpiece(s) with the knurl pattern.

Also presented herein are manufacturing systems for provisioning the assembly of battery pouch cells into battery modules of a battery pack. In an example, there is presented an automated or manually operated metalworking system for welding (e.g., joining, etc.) a metallic workpiece or stackup of metallic workpieces. The automated metalworking system includes an optional support frame designed to receive and support thereon one or more metallic workpieces, each of which has a surface with an adhesion-improving (anodized) treatment layer. During welding, these (anodized) treatment layers release gas when welded via the weld head. A metalworking device forms predefined debossed patterns into the surface or surfaces of each metallic workpiece. A laser welding device is operable to weld the metallic workpiece, e.g., to additional metallic workpiece(s).

Continuing with the discussion of the foregoing example, the metalworking system may also include a system controller that is communicatively connected to the metalworking device and the laser welding device. The system controller is programmed to command the metalworking device to form a knurl pattern into a contact surface of each metallic workpiece. The knurl pattern includes a network of channels that exhaust therethrough gas that is released from a welded section of the adhesion-improving (anodized) treatment layer. The system controller then commands the laser welding device to weld a joint region of the metallic workpiece surface with the knurl pattern. In other configurations, the metalworking device is operated manually to apply engineered debossed patterns into the workpiece surfaces.

For any of the disclosed systems, methods, and devices, the network of channels of the knurl pattern may include a first series of mutually parallel vent channels oriented at a first oblique angle with respect to a length of the workpiece and/or a direction of travel of the laser welding device during the welding of the joint region. The knurl pattern's channel network may further include a second series of mutually parallel vent channels oriented at a second oblique angle, distinct from the first oblique angle, with respect to the laser welding device's direction of travel. Optionally, the vent channels in the first series of mutually parallel vent channels may be oriented at an angle of about 45 to about 75 degrees with respect to the vent channels in the second series of mutually parallel vent channels. The two series of mutually parallel vent channels may consist essentially of recessed rectilinear channels that are interleaved with diamond-shaped protrusions.

For any of the disclosed systems, methods, and devices, the first metallic workpiece may include a rectangular aluminum or aluminum alloy sheet metal blank. In this instance, the adhesion-improving (anodized) treatment layer is an anodized layer, and the knurl pattern extends longitudinally across the sheet metal blank. The rectangular geometry of the sheet metal blank may be delineated by opposing first and second mutually parallel minor edges that extend between and connect opposing first and second mutually parallel major edges. The knurl pattern may extend in a continuous manor across the entire length of the blank, originating at the first minor edge and terminating at the second minor edge. As a further option, the knurl pattern is set back from both major edges.

For any of the disclosed systems, methods, and devices, the optional workpiece support frame may receive and retain an additional metallic workpiece with a surface having applied thereto an anodized layer. This adhesion-improving (anodized) treatment layer may be similar to or distinct from the treatment layer of the other metallic workpieces. The metalworking device forms a knurl pattern into a contact surface of the additional metallic workpiece. This knurl pattern, like those discussed above, includes a network of channels engineered to exhaust therethrough gases released from welded sections of the treatment layer. Prior to laser welding the joint region, the multiple metallic workpieces are stacked one on top of the other, with the treatment layer surfaces abutting and the knurl patterns facing each other. In this instance, the knurl pattern of the top workpiece includes a series of mutually parallel vent channels oriented at a distinct oblique angle with respect to the length of the workpiece and/or the welding device's direction of travel. The knurl pattern in the bottom workpiece includes another series of mutually parallel vent channels oriented at a distinct oblique angle with respect to the workpiece length and/or welding device's travel direction. When stacked, the vent channels of the top workpiece are oriented at an angle of about 45 to about 75 degrees with respect to the vent channels of the bottom workpiece, cooperatively forming a crosshatch grid system of vent channels.

For any of the disclosed systems, methods, and devices, the network of channels of a single workpiece includes a first series of mutually parallel vent channels that overlap with a second series of mutually parallel vent channels and interleave with an array of protrusions. The knurl spacing between adjacent channels is about 1.5 to 3.0 times the thickness of the metallic workpiece. As yet a further option, the vent channels of the channels network each has a depth of about 15% to about 45% of the thickness of the metallic workpiece.

Additional aspects of the present disclosure are directed to techniques, algorithms, and logic for operating any of the disclosed manufacturing systems or manufacturing any of the disclosed workpieces. Aspects of the present disclosure are also directed to automated or intelligent control system architectures for provisioning laser welding of lithium-ion battery cell tabs to each other and/or to a busbar, e.g., within a module of a traction battery pack. Also presented herein are non-transitory, computer readable media storing instructions executable by at least one of one or more processors of one or more programmable control units, such as an electronic control unit (ECU) or control module, to govern operation of a disclosed system.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
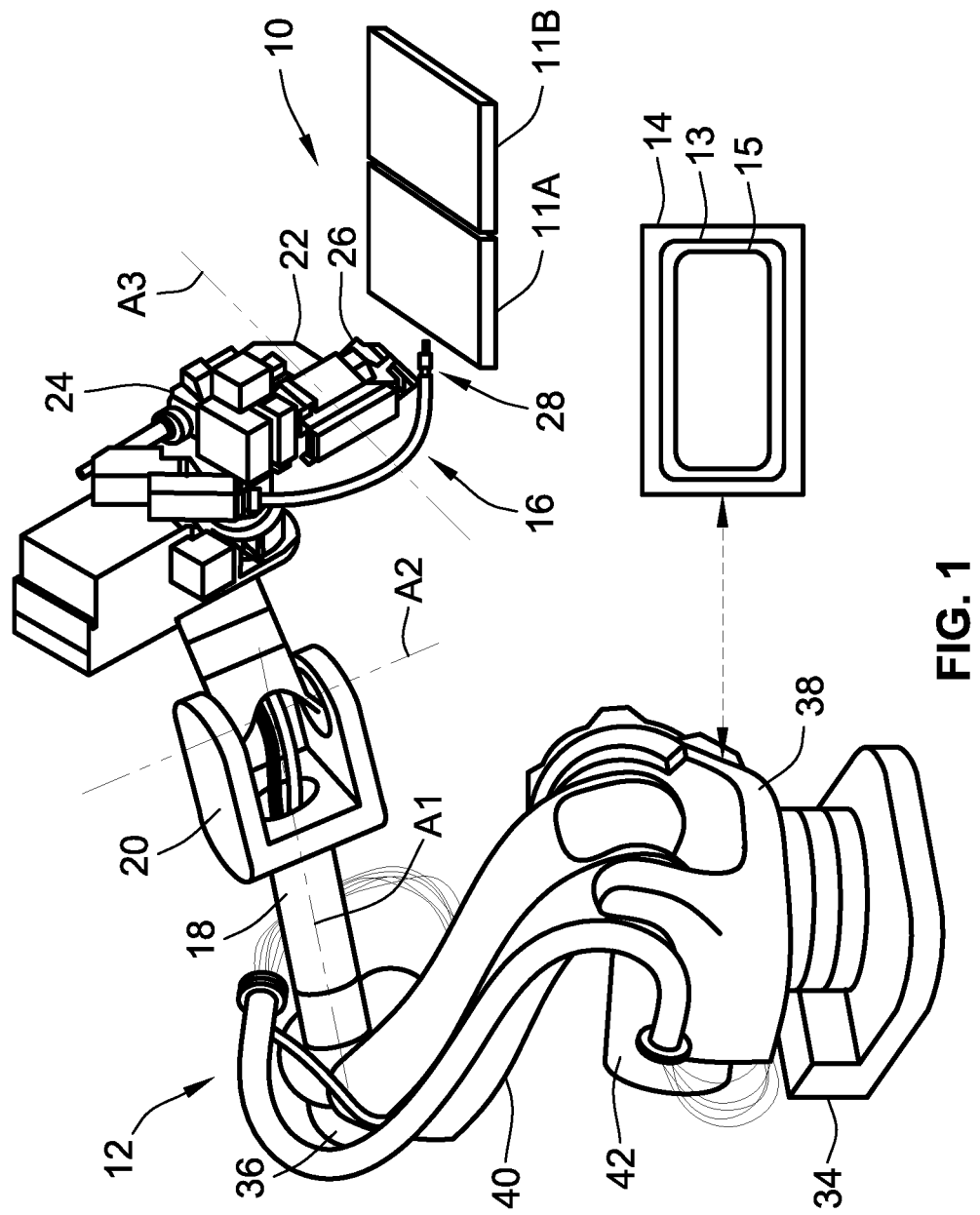
FIG. 1 is an elevated, perspective-view illustration of a representative automated laser welding system for fabrication or repair of one or more workpieces in accordance with aspects of the present disclosure.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example.

Referring now to the drawings, wherein like reference numbers refer to like features throughout the several views, there is shown in FIG. 1 an illustration of a representative metalworking system, which is designated generally at 10 and portrayed herein for purposes of discussion as a robotic laser beam welding (LBW) cell. The illustrated robotic LBW cell 10—also referred to herein as "workpiece processing system" or "manufacturing system"—is merely an exemplary application with which aspects and features of this disclosure may be practiced. In the same vein, incorporation of the present concepts into welding of anodized aluminum battery cell tabs should also be appreciated as an exemplary implementation of the concepts disclosed herein. As such, it will be understood that aspects of the present disclosure may be incorporated into other robotic and non-robotic weld system architectures, may be implemented for fabrication/repair of other workpieces, and may be implemented for any logically relevant type of workpiece processing operation. In addition, the systems, methods, and devices provided herein can be employed for operating on a single workpiece, for joining together two or more workpieces, or for joining together two segments of a single workpiece. Lastly, the drawings presented herein are not necessarily to scale and are provided purely for instructional purposes. Thus, the specific and relative dimensions shown in the drawings are not to be construed as limiting.

Robotic LBW cell 10 of FIG. 1 is generally represented in the drawings by a free-standing, computer-automated robot 12 that communicates, e.g., wired or wirelessly, with an electronic robot weld controller ("system controller") 14 that governs operation of the robot 12. An end effector—portrayed herein as a laser welding head 16 ("processing head")—is attached to the robot 12 to allow the robot 12 to perform one or more tasks on a single workpiece 11A or 11B or multiple workpieces 11A and 11B, including but not limited to welding, brazing, cutting, assembling, adjusting, and/or inspecting parts. As will be described in further detail hereinbelow, the laser welding head 16 is designed to selectively complete one or more welding operations along one or more weld joint regions of one or more surface-treated metallic workpieces. Movement of the robot 12 may be provided by means of servomotors, linear and rotational transducers, pneumatic actuators, hydraulic actuators, or by any pertinent type of actuation mechanism. In the same vein, the robot 12 may have six degrees of freedom of motion, as shown, or have any other suitable number of degrees of freedom of motion.

In the illustrated example, the laser welding head 16 is mounted to a robot arm 18 in a repositionable and re-orientable manner. In the figure, denoted at 20 is a mechanical joint—more commonly referred to as a "robot wrist"—for movably mounting the laser welding head 16 to the robot arm 18 in a pivotable and rotatable manner. For example, the laser welding head 16 is operable to rotate about a first axis A1 extending longitudinally through the center of the robot arm 18, and pivot about a second axis A2 extending transversely through a center coupling of the robot wrist 20. The laser welding head 16 also includes a support frame 22 adjacent the robot wrist 20 at which the weld head 16 pivotably mounts to the robot 12 for guided movement of the weld head 16 to carry out a predetermined welding operation. An electronic actuator, which is portrayed in FIG. 1 as a controller-activated electric servomotor 24 fixed adjacent to the support frame 22, is operable, e.g., via robot weld controller 14, to pivot the laser welding head 16 about a third axis A3 extending lengthwise through a pivot coupling of the support frame 22.

With continuing reference to FIG. 1, a stationary base 34 operatively supports the robot 12 and, thus, the laser welding head 16. The robot 12 is shown as a freestanding apparatus, e.g., with the base 34 seated on and fixed to a factory floor. However, it should be appreciated that the base 34 and, thus, the robot 12 can be mounted at various other locations in a variety of different manners, including, but not limited to, a factory wall, ceiling, support truss, wheeled base, etc., without departing from the scope of this disclosure. An articulating joint assembly 36 is movably mounted on the base 34 for a swivel movement about a vertical axis via a swivel frame 38 and support post 40. The swivel movement of the robot 12 is produced, for example, by means of a robot swivel servomotor 42 or other servomechanism that is provided on the swivel frame 38. The controller 14 is programmed, at least in part, to control the automation of the robot 12, including movement of all corresponding robot components. By way of example, the controller 14 regulates the swiveling of swivel frame 38 on the base 34, the pivoting of support post 40 on the swivel frame 38, articulation of robot arm 18 with respect to the support post 40, and the rotating and pivoting of laser welding head 16 via the robot wrist 20. Robot weld controller 14 is also programmed to control the selective welding operations of the laser welding head 16, including the pivoting movement of the head 16 on support frame 22 and corresponding activation and deactivation of a high-intensity laser 26 ("beam emitter") and a wire feeder 28 borne by the laser welding head 16.

As indicated above, robot weld controller 14 is constructed and programmed to automate, among other things, the movement and operation of the robot 12 and laser welding head 16 and, if so desired, other devices within the manufacturing system. Control module, module, controller, control unit, processor, and permutations thereof may be defined to include any one or various combinations of one or more of logic circuits, Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), shown schematically at 13 in FIG. 1, whether resident, remote or a combination of both, store processor-executable software, firmware programs, routines, etc., which are collectively represented at 15.

Software, firmware, programs, instructions, routines, code, algorithms, and similar terms may be used interchangeably and synonymously to mean any processor-executable instruction sets, including calibrations and look-up tables. The system controller 14 may be designed with a set of control routines and logic executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing use or operation of the system 10.

Automated robotic LBW cell 10 may be used for joining the electrical tabs of a lithium ion battery pouch cell, for example, to neighboring cells and/or to a direct current (DC)

busbar. In electrified automotive powertrains, the cell tabs are oftentimes fabricated from aluminum or an alloy thereof that is anodized for improved corrosion resistance and pouch sealing. When anodized aluminum cell tabs are laser welded to a copper (Cu) or aluminum (Al) bus bar, the moisture absorbed by aluminum oxides in the anodized layer dissociate and release hydrogen. The released hydrogen is absorbed readily in the liquid weld puddle, but the solubility of hydrogen in the solidifying weld is greatly reduced, prompting the dissolved hydrogen to escape from the solidifying weld into the atmosphere; when there is insufficient time to expel, such as is common during laser welding, the dissolved gases become trapped inside the weld and form porosities.

To ameliorate porosity formation during laser welding of anodized Al tabs, a rolling, stamping or similarly suitable metalworking process knurls the battery cell tabs to create an engineered "serration" pattern with a predefined topography on the tab's top and/or bottom contact surfaces. When multiple battery cell tabs are stacked together and clamped against to a busbar for welding, these engineered knurl patterns define venting paths between the abutting surfaces of the stack. During laser welding, dissolved gases from the welded anodized layer readily escape from the melt through these venting channels before being trapped in the solidifying welds. Weld quality—strength, uniformity, electrical conductivity, etc.—is drastically improved through reduced weld joint porosity.

Figure 2:
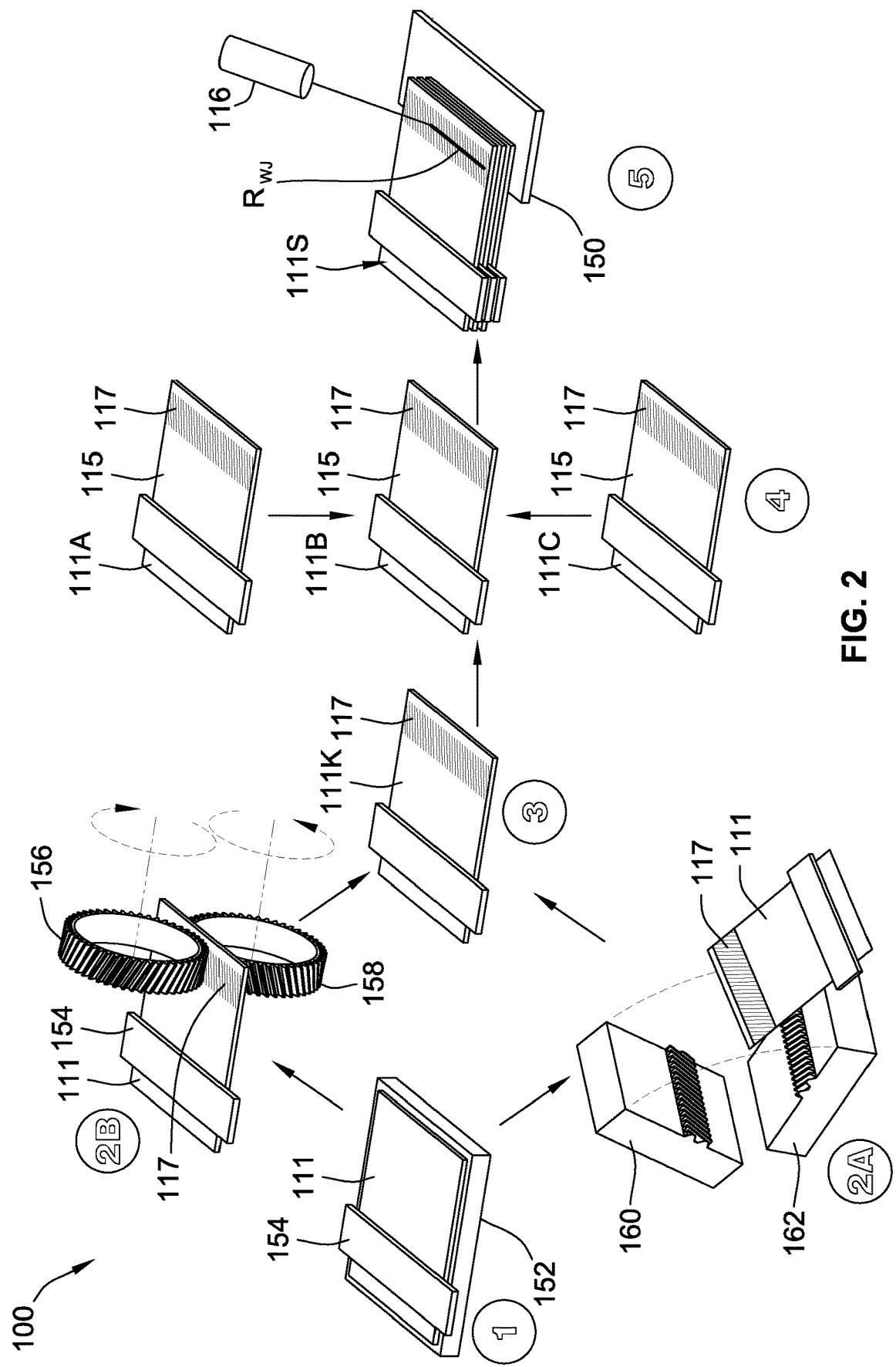
FIG. 2 in a schematic process-flow diagram illustrating a representative method of manufacturing aluminum or aluminum alloy battery cell tabs with an anodized layer using knurling and laser welding in accordance with aspects of the present disclosure.

FIG. 2 illustrates a workflow diagram representative of a method 100 of manufacturing aluminum or aluminum alloy battery cell tabs 111A, 111B and 100C, including the knurling and laser welding of a stackup 111S of the cell tabs 111A, 111B and 100C to an electrical busbar 150. While not per se required, the illustrated battery cell tabs 111A-111C may be substantially identical for ease of manufacture and reduced part costs; thus, for purposes of brevity and ease of reference, the structure and pre-weld processing of all three cell tabs 111A-111C may be described below with reference to a single battery cell tab 111 (also referred to herein as "workpiece"). While aspects of the present disclosure are discussed in the context of a rectangular-shaped aluminum tab, persons skilled in the art will appreciate that the present disclosure is applicable to metallic workpieces of about any size, shape, and cross section.

Method 100 may begin with processor-executable instructions executed by a programmable controller or control module or similarly suitable processor to call up an initialization procedure for a closed-loop control sequence for performing knurling and welding operations on metallic workpieces. This protocol may initialize in response to a user prompt from a system operator or technician of the robotic LBW cell 10, or responsive to a broadcast prompt signal from a backend server-class computer or middleware computing node tasked with governing operation of a robotic cell, a collection of robot cells, or a manufacturing facility incorporating therein one or more robot cells. Initial stages of the manufacturing process may comprise supplying, accessing, and/or utilizing (collectively "providing") the various materials, tools, and machines needed to manufacture the cell tabs. Likewise, an initial system setup may be carried out on the robotic LBW cell 10 through a suitable human machine interface (HMI), including powering on the laser welding head 16, and calibrating a "home location" and a present "beam location" of a laser beam emitted by the weld head. Additional control commands, tolerances, and parameters may be entered at this juncture prior to commencement of a desired metalworking operation.

Upon completion of any requisite preliminary procedures, method 100 advances to a first process step (1) whereat a workpiece support frame, represented in FIG. 2 by a repositionable weld anvil 152, receives and supports thereon one or more metallic workpieces 111. Each workpiece 111 may be stamped, cut, milled, or otherwise extricated from aluminum sheet metal as a flat, single-piece blank with a rectangular-polyhedron geometry. As indicated above, the entire sheet metal blank or, if desired, only select major and/or minor faces of the blank may be coated with or treated to form an anodic film that functions as a treatment layer to increase the cell tab's resistance to corrosion. A split-nut clamping plate 154 or similarly suitable fastening device may be used to secure the workpiece(s) 111 in place on the weld anvil 152. Material handling operations for providing, setting, clamping, and transferring parts during manufacture may be automated or select operations may be performed manually.

During the second process step (2A) and (2B) of method 100, an engineered "serrated" pattern 117 (also referred to herein as "knurl pattern") is knurled into each metallic workpiece 111, generally isolated to the workpiece contact surface or opposing top and bottom-side contact surfaces that will be subject to welding. As indicated at optional second process step (2B), one option is utilizing a knurl rolling operation in which a set of knurl rollers—a top-side (first) knurl roller 156 juxtaposed with a bottom-side (second) knurl roller 158—simultaneously rolls across and compresses therebetween the Al sheet metal blank. Each knurl roller 156, 158 may be formed with an inverse transpose of the knurl pattern imprinted onto the outer diameter surface thereof. For at least some embodiments, it may be desirable to knurl only a single workpiece contact surface; in that case, a straight knurl operation utilizes a single knurl roller 156 with the workpiece 111 buttressed on the weld anvil 152 or similarly functioning support platform. Alternatively, the method 100 may forego knurl rollers in preference of a knurl stamping operation (i.e., debossing) shown at alternative second process step (2A). In this instance, a set of knurl dies—a top-side (first) knurl die 160 juxtaposed with a bottom-side (second) knurl die 162—simultaneously presses against and compresses therebetween the Al sheet metal blank. Like the knurl rollers 156, 158, the knurl dies 160, 162 may be formed from heat-treated and/or work-hardened steel with an inverse transpose of the knurl pattern imprinted onto a die face thereof.

Figure 3:
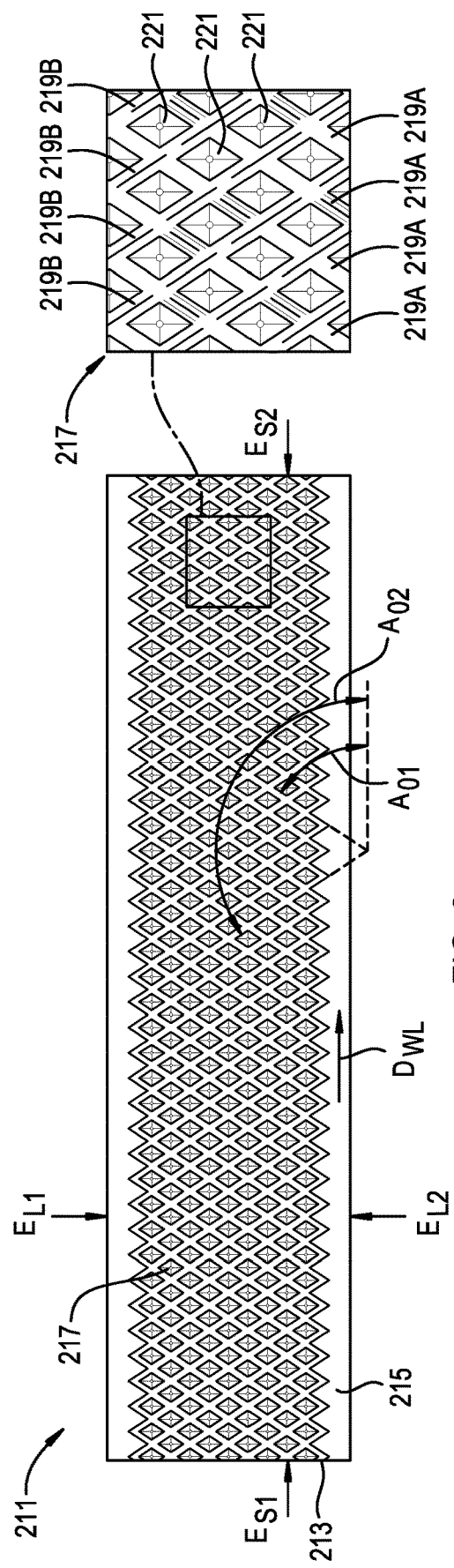
FIG. 3 is a perspective view illustration of a representative metallic workpiece with a knurl pattern in accord with aspects of the disclosed concepts.
Figure 4:
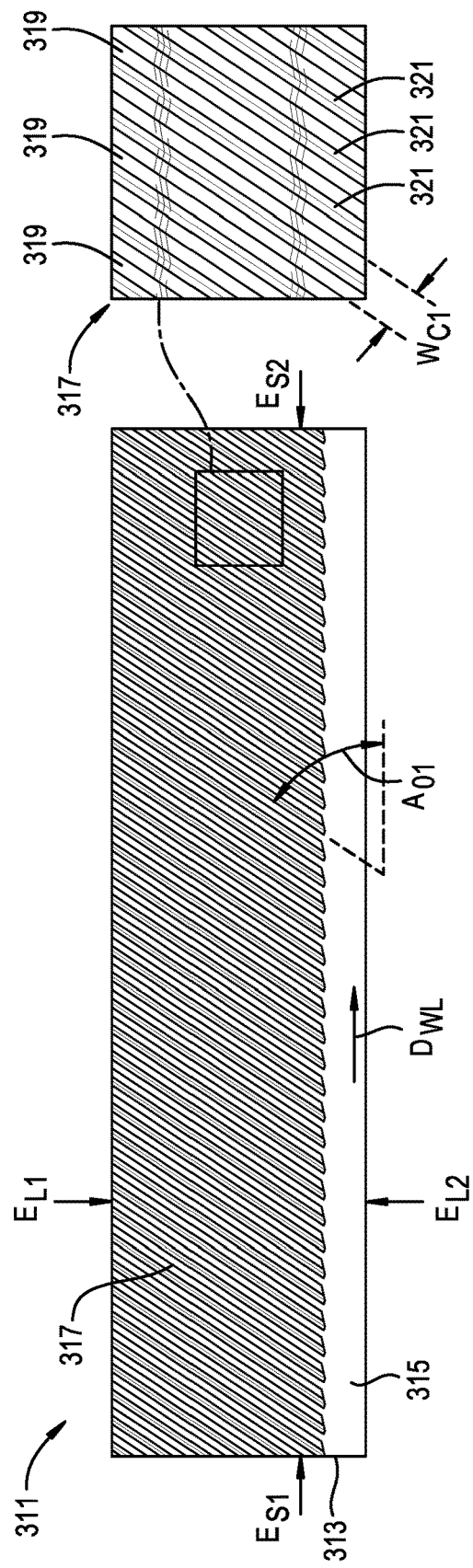
FIG. 4 is a perspective view illustration of another representative metallic workpiece with another knurl pattern in accord with aspects of the disclosed concepts.

A "knurl pattern," as used herein, may be typified by a predefined arrangement of recessed channels, interconnecting gaps, and interleaved protrusions in the workpiece surface that cooperatively define venting paths for evacuating dissolved gases released during welding. FIGS. 3 and 4, for example, illustrate two representative workpieces 211 and 311 fabricated from respective sheet metal blanks 213 and 313 with a top major surface having applied thereto a treatment layer 215 and 315. While differing in appearance, it is envisioned that the features and options disclosed above with reference to the workpieces 11 and 111 of FIGS. 1 and 2 may be incorporated, singly or in any combination, into each other and into the examples of FIGS. 3 and 4, and vice versa. Recessed into the treated workpiece surface of the sheet metal blanks 213, 313 is a knurl pattern 217 and 317, respectively, that is designed to vent entrained gas from molten weld puddles. A knurl pattern may take on an assortment of repeating geometric shapes, including a cross-hatched lattice-type pattern (FIG. 3) or a diagonal stripe regimental-type pattern (FIG. 4). In general, the knurl pattern 217, 317 may cover the entire surface of the sheet meal blank's 213, 313 major face or may be isolated to a select segment or segments thereof where the weld will be made. For at least some applications, it may be desirable that the knurl pattern 217, 317 extend past and envelop the outer perimeter of the weld bead by a predefined distance (e.g., at least about 3-7 millimeters (mm) on each side).

Each knurl pattern 217, 317 contains a network of recessed channels 219A, 219B (FIG. 3) and 319 (FIG. 4) designed to exhaust therethrough gases released from a welded section of the treatment layers 215, 315. As seen in the inset view of FIG. 4, for example, the knurl pattern 317 is composed of or, if desired, consists essentially of a single series of mutually parallel "forward-pitched" vent channels 319. In accord with the illustrated example, the vent channels 319 are recessed rectilinear grooves that are spaced longitudinally from one another along the length of the workpiece 311. The vent channels 319 are interleaved with and separated from one another by protruding arched-top walls 321. These vent channels 319 are oriented at a predetermined (first) oblique angle $A_{O1}$ (e.g., about 50-70 degrees or, as shown, approximately 60°) with respect to the length of the workpiece, which may also correspond to a direction of travel $D_{WL}$ of the laser welding device during welding of the joint region. The channel width $W_{C1}$ of each vent channel 319 may be proportional to a material thickness of the workpiece 311 (e.g., 1.0 mm thick workpiece formed with 1.0 mm wide channels).

Similar to the configuration depicted in FIG. 4, the knurl pattern 217 of FIG. 3 includes a forward-pitched (first) series of mutually parallel vent channels 219A. In this instance, however, the vent channels 219A overlap with a rearward-pitched (second) series of mutually parallel vent channels 219B. Each vent channel 219A, 219B is a recessed rectilinear groove that is spaced longitudinally from neighboring channels 219A, 219B of its respective series along the length of the workpiece 211. Interleaved between the vent channels 219A, 219B are diamond-shaped, round-top protrusions 221. Like the vent channels 318 of FIG. 4, the first series of vent channels 219A of FIG. 3 are oriented at a predetermined (first) oblique angle $A_{O1}$ (e.g., about 50-70 degrees or, as shown, approximately 60°) with respect to the direction of travel $D_{WL}$ of the laser welding device during. In this regard, the vent channels 219B of the second series are oriented at a different (second) oblique angle $A_{O1}$ (e.g., about 110-130 degrees or, as shown, approximately 120°) with respect to the weld laser's direction of travel $D_{WL}$. As such, the first series of vent channels 219A are angled about 45 to about 75 degrees or, as shown, approximately 60° with respect to the second series of vent channels 219B. It should be appreciated that the number, length, width, depth, and orientation of channels in each series may be varied from that which are shown in the drawings without departing from the scope of this disclosure.

With continuing reference to both FIGS. 3 and 4, the sheet metal blanks 211, 311 are portrayed as orthogonal rectangular polyhedrons with opposing short-side "minor" edges $E_{S1}$ and $E_{S2}$ (edges with shortest plan-view length) extending between and connecting opposing long-side "major" edges $E_{L1}$ and $E_{L2}$ (edges with longest plan-view length). In both examples, the knurl patterns 217, 317 extend the entire longitudinal length of the sheet metal blank's 211, 311, from the first minor/short edge $E_{S1}$ to the second minor/short edge Est, across the blank's major face(s) (faces with largest surface area). By way of comparison, the knurl pattern 217 of FIG. 3 is set back a predetermined offset distance from both the first and second major edges $E_{L1}$ $E_{L2}$, whereas the knurl pattern 317 of FIG. 4 is set back from the second major edge $E_{L1}$ $E_{L2}$ yet extends transversely to and terminates at the first major edge $E_{L1}$.

If two workpieces 311 with the diagonal-striped knurl pattern 317 of FIG. 4 are stacked in opposing faced relation for welding, it may be desirable that the vent channels 319 of the top one of the workpieces 311 be pitched in a forward (or rearward) direction and the bottom one of the workpieces 311 be pitched in the opposite rearward (or forward) direction with respect to the weld laser's direction of travel $D_{WL}$. In so doing, when properly stacked and aligned, the knurl patterns 317 of the abutting workpieces 311 form a crosshatch pattern similar to that shown in FIG. 3. This crisscross arrangement helps to ensure both sufficient tab-to-tab material contact for weld joint formation, as well as sufficient channel depth and clearance for gas to vent through the knurl pattern channels. In addition, these peaks and valleys create a surface texture of the contact area that enables a hybrid weld, such as a hybrid lap-fillet joint.

As indicated above, the depths and widths and separation lengths of the vent channels 219A-B, 319 may be cooperatively engineered to optimize gas and concomitantly improve weld quality. In an example, a channel depth of the vent channels 219A-B, 319 may be approximately 10-70% or, as shown, about 60% of the workpiece thickness (e.g., 1.0 mm thick workpiece formed with 0.6 mm deep channels). To help ensure the stiffness and integrity of the workpiece 211, 311 is not compromised (e.g., made too thin), the knurl spacing may be proportionally related to the material thickness of the workpiece. For instance, the knurl spacing between adjacent channels may be about 1.5 to about 3.0 times the tab thickness. For thicker material workpieces, a lower % ratio may be employed. In either case, it may be desirable that the protrusions/channels be equally spaced from each other. Both of the illustrated knurl patterns 217, 317 have been benchmarked to show a marked reduction in internal weld porosity, resulting in a more robust connection for electrical conductivity, and a more robust mechanical fatigue resistance.

Turning back to FIG. 2, the second process step (2A) and (2B) generates a knurled workpiece 111K; at third process step (3), this workpiece 111K is transferred (e.g., via hand, conveyor belt, material handling robot, etc.) from the metalworking device to a stacking device (not shown). Prior to performing the final joining operation, a predefined number (e.g., three) metallic workpieces 111A, 111B and 111C are stacked one on top of the other, as illustrated at fourth process step (4). These workpieces 111A-C are stacked with each knurled contact surface 115 abutting an opposite-facing knurled contact surface, and with the knurl patterns 117 aligned to face each other. When stacking is complete, the workpiece stackup 111S subassembly is clamped in place and welded via a laser welding device 116 (e.g., laser welding head 16 of FIG. 1). At fifth process step (5), a weld joint region $R_{WJ}$ of the stacked metallic workpieces, surrounded by the knurl pattern 117, is formed in the workpiece stackup 111S.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for laser welding one or more workpieces, the method comprising:
   receiving a first metallic workpiece with a pair of opposing first workpiece surfaces each having applied thereto a first anodized layer, the first anodized layer releasing gas when welded;
   forming, via a metalworking device, a first knurl pattern into each of the opposing first workpiece surfaces of the first metallic workpiece, the first knurl pattern including a first network of channels configured to exhaust therethrough the gas released from the first anodized layer, the first network of channels including first and second series of mutually parallel vent channels oriented at first and second oblique angles, respectively, with respect to a length of the first metallic workpiece, wherein the vent channels in the first series of mutually parallel vent channels are oriented at an angle of about 45 degrees to about 75 degrees with respect to the vent channels in the second series of mutually parallel vent channels; and
   welding, via a laser welding device, a joint region of the opposing first workpiece surfaces of the first metallic workpiece with the first knurl pattern.

2. The method of claim 1, wherein the vent channels in the first and second series of mutually parallel vent channels are recessed rectilinear channels interleaved with round-top protrusions.

3. The method of claim 1, wherein the first metallic workpiece is a battery tab that includes a rectangular aluminum or aluminum alloy sheet metal blank, and the first knurl pattern extends longitudinally across the sheet metal blank.

4. The method of claim 3, wherein the sheet metal blank includes opposing first and second minor edges extending between and connecting opposing first and second major edges, and wherein the first knurl pattern extends from the first minor edge to the second minor edge.

5. The method of claim 4, wherein the first knurl pattern is set back from the first and second major edges.

6. The method of claim 1, further comprising:
   receiving a second metallic workpiece with a second workpiece surface having applied thereto a second anodized layer that releases gas when welded;
   forming a second knurl pattern into the second workpiece surface of the second metallic workpiece, the second knurl pattern including a second network of channels configured to exhaust therethrough the gas released from the second anodized layer; and
   stacking, prior to welding the joint region, the first and second metallic workpieces with at least one of the first workpiece surfaces and the second workpiece surface abutting each other and the first and second knurl patterns facing each other.

7. The method of claim 6, wherein the second network of channels includes a third series of mutually parallel vent channels oriented at a third oblique angle with respect to a direction of travel of the laser welding device.

8. The method of claim 1, wherein the first series of mutually parallel vent channels overlaps the second series of mutually parallel vent channels.

9. The method of claim 1, wherein the vent channels in the first series of mutually parallel vent channels each has a depth of about 15% to about 65% a thickness of the first metallic workpiece.

10. A method of laser welding metallic workpieces, the method comprising:
    receiving a first metallic workpiece with a first workpiece surface having applied thereto a first anodized layer that releases gas when welded;
    receiving a second metallic workpiece with a second workpiece surface having applied thereto a second anodized layer that releases gas when welded;
    forming, via a metalworking device, a first knurl pattern into the first workpiece surface of the first metallic workpiece, the first knurl pattern including a first set of channels configured to exhaust therethrough the gas released from the first anodized layer, the first set of channels including a first series of mutually parallel vent channels oriented at a first oblique angle with respect to a length of the first metallic workpiece;
    forming, via the metalworking device, a second knurl pattern into the second workpiece surface of the second metallic workpiece, the second knurl pattern including a second set of channels configured to exhaust therethrough the gas released from the second anodized layer, the second set of channels including a second series of mutually parallel vent channels oriented at a second oblique angle with respect to a length of the second metallic workpiece;
    stacking the first and second metallic workpieces with the first workpiece surface abutting the second workpiece surface such that the first knurl pattern faces the second knurl pattern and the vent channels in the first series of mutually parallel vent channels are oriented at an angle of about 45 degrees to about 75 degrees with respect to the vent channels in the second series of mutually parallel vent channels; and
    welding, via a laser welding device, a joint region of the first and second workpiece surfaces with the first and second knurl patterns.

11. A metalworking system, comprising:
    a metalworking device configured to form patterns into a first metallic workpiece, the first metallic workpiece including a pair of opposing first workpiece surfaces each having applied thereto a first anodized layer, the first anodized layer releasing gas when welded, the metalworking device being selectively operable to form a first knurl pattern into each of the opposing first workpiece surfaces of the first metallic workpiece, the first knurl pattern including a first network of channels configured to exhaust therethrough the gas released from the first anodized layer; and
    a laser welding device operable to weld the first metallic workpiece, the laser welding device being selectively operable to weld a joint region of the opposing first workpiece surfaces of the first metallic workpiece with the first knurl pattern,
    wherein the first network of channels includes a first series of mutually parallel vent channels and a second series of mutually parallel vent channels, the vent channels in the first series of mutually parallel vent channels being oriented at an angle of about 45 degrees to about 75 degrees with respect to the vent channels in the second series of mutually parallel vent channels.

12. The metalworking system of claim 11, wherein the first series of mutually parallel vent channels is oriented at a first oblique angle with respect to a direction of travel of the laser welding device during the welding of the joint region.

13. The metalworking system of claim 11, wherein the first series of mutually parallel vent channels is oriented at a first oblique angle with respect to a direction of travel of the laser welding device during the welding of the joint region, and the second series of mutually parallel vent channels is oriented at a second oblique angle, distinct from the first oblique angle, with respect to the direction of travel of the laser welding device.

14. The metalworking system of claim 11, wherein the first metallic workpiece includes a rectangular aluminum or aluminum alloy sheet metal blank, and the first knurl pattern extends longitudinally across the sheet metal blank.

15. The metalworking system of claim 14, wherein the sheet metal blank includes opposing first and second minor edges extending between and connecting opposing first and second major edges, and wherein the first knurl pattern extends from the first major edge to the second major edge.

16. The metalworking system of claim 11, wherein the first series of mutually parallel vent channels overlaps the second series of mutually parallel vent channels.

17. The metalworking system of claim 11, wherein the vent channels in the first series of mutually parallel vent channels each has a depth of about 15% to about 65% a thickness of the first metallic workpiece.

18. The metalworking system of claim 11, wherein the vent channels in the first and second series of mutually parallel vent channels are recessed rectilinear channels.

19. The metalworking system of claim 11, wherein the metalworking device is further operable to form a second knurl pattern into a second workpiece surface of a second metallic workpiece having applied thereto a second anodized layer that releases gas when welded, the second knurl pattern including a second network of channels configured to exhaust therethrough the gas released from the second anodized layer.

20. The metalworking system of claim 19, wherein the second network of channels includes a third series of mutually parallel vent channels oriented at a third oblique angle with respect to a direction of travel of the laser welding device.

* * * * *